US006404456B1

(12) United States Patent
Smith

(10) Patent No.: US 6,404,456 B1
(45) Date of Patent: Jun. 11, 2002

(54) CALIBRATING PROJECTION DISPLAYS

(75) Inventor: Ronald D. Smith, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/252,383

(22) Filed: Feb. 18, 1999

(51) Int. Cl.[7] .................................................. H04N 5/74
(52) U.S. Cl. ........................ 348/178; 348/383; 348/745
(58) Field of Search .................................. 348/177–178, 348/383, 744, 745, 746, 747; 345/1.1; H04N 9/28, 9/31, 5/74

(56) References Cited

U.S. PATENT DOCUMENTS 4,739,396 A * 4/1988 Hyatt .......................... 348/748
4,868,668 A * 9/1989 Tavernetti .................... 348/745
6,219,011 B1 * 4/2001 Aloni et al. ................. 348/745

OTHER PUBLICATIONS

Smith, U.S. Patent Application Serial No. 09/259,396, filed Feb. 26, 1999, entitled "Correcting Non–Uniformity in Displays" (US PN#6,285,349).

* cited by examiner

Primary Examiner—David E. Harvey
(74) Attorney, Agent, or Firm—Trop, Pruner & Hu, P.C.

(57) ABSTRACT

In a projection display system, a sample of the light output may be extracted and used to calibrate the display. A sample may also be used in multi-display systems (e.g., light walls), wherein the information from one display in the form of a light sample may be shared with one or more additional displays. In this way, certain characteristics of multiple displays may be correlated with one another to produce a uniform display output.

24 Claims, 3 Drawing Sheets

CALIBRATING PROJECTION DISPLAYS

BACKGROUND

This invention relates generally to projection displays, e.g., computer monitors or televisions that project an image onto a screen to enlarge the image.

A display wall may be formed from a plurality of displays, each displaying a portion of an overall composite image. In a wall display, commonly used in retail stores and sports events, a plurality of displays are arranged in an array or grid, such that the displays are sufficiently close to one another that they are able to collectively display a composite image, formed of the portions displayed by each individual display.

Non-uniformity may arise in the composite display because of variations between the different individual displays making up the composite. For example, one display may have a lower light output than the others, causing it to appear distinctly different, disrupting the uniformity of the overall display. Such variations may arise because of variations in the processes used to manufacture the individual displays or due to variations in the adjustment of the brightness and contrast between various displays.

Display walls may be formed of displays which use liquid crystal projection techniques. A light path, which may include a light source, lenses, and a light valve may be used to create an image from a video input. The image may be projected onto a large display screen to form an individual display unit. In one technique for forming such light valves, a reflective liquid crystal display (LCD) may have a reflective surface on one side.

Semiconductor process variations may cause variations in the image created by one display, compared to others formed by the same process, by the same manufacturer. In addition, variations may produce a blockiness to the composite display, which decreases the composite effect the display wall attempts to create.

Thus, there is a need to improve the uniformity of projection displays.

SUMMARY

In accordance with one aspect, a method of calibrating a projection display includes generating a light output containing image information. A sample is extracted from the light output and is used to calibrate the display. The light output is then projected onto a display screen.

DETAILED DESCRIPTION

Figure 1:
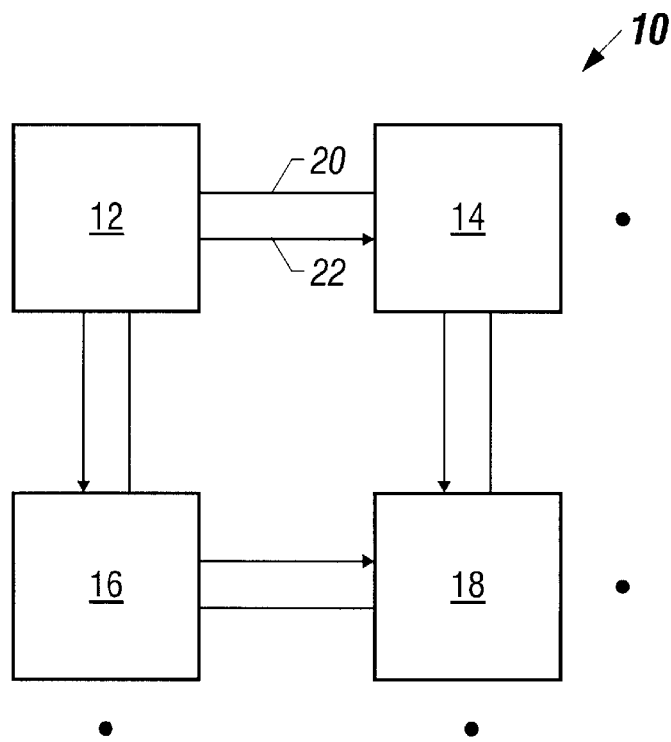
FIG. 1 is a block depiction of a portion of a display wall in accordance with one embodiment of the present invention.

Referring to FIG. 1, a display wall 10 may be made up of a plurality of individual displays, including the displays 12, 14, 16 and 18. Generally, each of the displays 12 through 18 may be situated in sufficient proximity to one another to avoid unduly interrupting the composite image formed by the display wall. However, in order to show the interaction between the individual displays, that spacing is exaggerated in FIG. 1.

The upper leftmost display 12 may communicate electrically with its neighbor to the right 14 and the lower display 16 over the paths 20. Light information may be shared between the displays 12 through 18 over the paths 22. Thus, in one embodiment to the present invention, samples of the light information from one display may be shared with two neighbors to facilitate coordination of display characteristics throughout the display wall. Information from one display may be shared with two neighbors, for example, so that information about each of the displays is eventually shared throughout the display wall 10. In this way, the entire display wall may be calibrated to reduce the nonuniformity arising from individual characteristics of particular displays making up the display wall.

Figure 2:
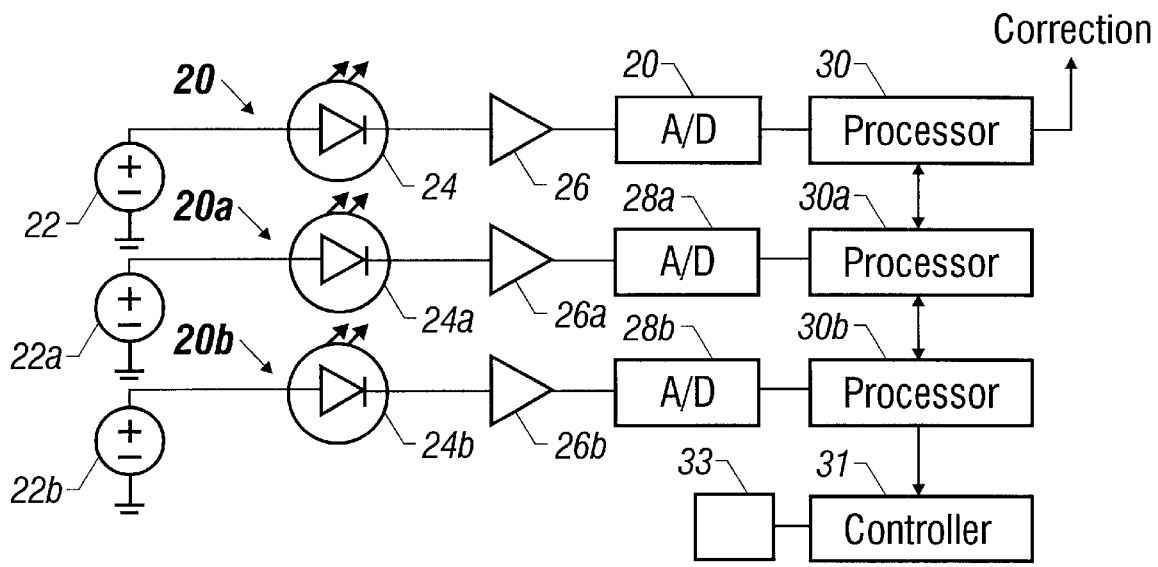
FIG. 2 is a block diagram of the detection and processing circuitry utilized by one display in the display wall shown in FIG. 1.

Referring now to FIG. 2, light analyzer 21 for a given display includes three circuits 23, in one embodiment of the present invention. A DC source of potential 22 may be coupled to a photodetector 24, e.g., a photodiode, an amplifier 26, an analog to digital (A/D) converter 28, and a processor 30 in each circuit 23. Each photodetector 24 may receive a sample of the light produced by a display and may provide that sample to a processor 30 for evaluation. For example, a sample from a display 18 may be analyzed by the circuit 23 and samples from displays 14 and 16 neighboring the display 18 may be analyzed by the circuits 23a and 23b. The light from the displays 14 and 16 may be transmitted from the displays 14 and 16 over paths 22. The paths 22 may be simply light paths which may be, for example, a physical path such as a fiber optic cable or simply an opening through which light may pass.

Each of the samples received by the photodetectors 24, 24a and 24b may be analyzed by a processor 30, 30a and 30b under control of a controller 31, which may be a controller coupled to control all the displays in a given display wall 10. The controller 31 may include a memory 33, which includes calibration software. The processors 30, for a given display, may jointly develop a correction factor, which corrects that display to the characteristics of another display in the display wall.

For example, in accordance with one embodiment of the invention, the upper leftmost display 12 may be automatically denominated the master. This denomination may be unambiguously determined by virtue of the fact that it is the only display which never receives light from its leftmost or uppermost neighbors, because there are none. An operator pressing a calibration mode switch on a chosen master may also effect this denomination. The master initiates a calibration mode communicating with its neighbors in a fashion resembling that used by a TV remote control. The displays 14 and 16 then adjust their characteristics based on the samples received from the display 12. However, a display 14 or 16 that has characteristics different than the display 12 may not be able to copy the characteristics of the display 12. For example, the maximum light output of one of the displays 14 or 16 may be less than that of the display 12. In such case, the "weaker" display may then become the "model", which the other displays may be forced to emulate, in one embodiment of the present invention. The term "weaker" relates to display characteristics, e.g., light output, light intensity, or other characteristics that may not be attainable by every display.

Thus, in the case of light output, one display may be capable of a maximum level of light output, which is below that of other displays. As a result, it may be desirable to cause each of the displays to reduce their light outputs to match the weaker display to create a more uniform appearance for the entire display wall.

Figure 3:
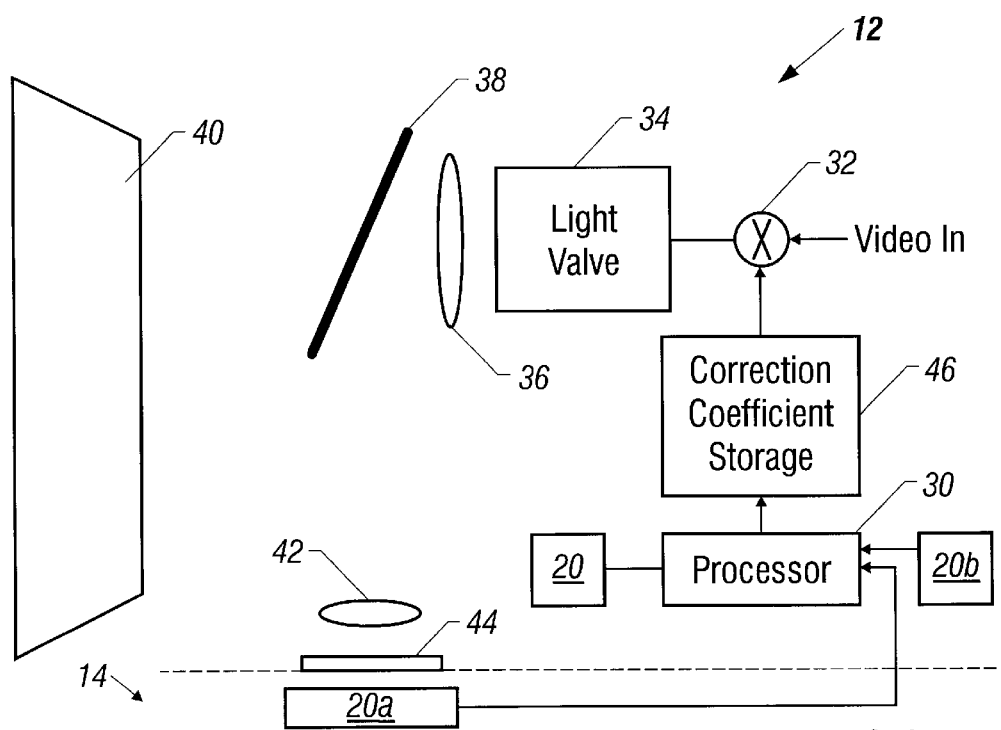
FIG. 3 is a schematic depiction of a projection display in accordance with one embodiment of the present invention.

One technique for developing the light output from a display and extracting a sample of that light output, shown in FIG. 3, includes a multiplier 32 that receives a video input. In one embodiment of the invention, a variable gain amplifier or a pixel value multiplier may be used as the multiplier 32. The multiplier 32 maybe coupled to a light valve 34, which in one embodiment of the present invention, may include a reflective liquid crystal display (LCD). Light generated by the light valve 34 may pass through a projection lens 36, which projects the light onto a display screen 40 through a sampling glass 38.

The sampling glass 38, which may be made of any substantially transparent material (including glass or plastic), may effectively extract a small portion of the light output of the light valve 34 and projection lens 36 by virtue of its relatively low reflectivity. While most of the incident light passes through the glass 38, a small portion (for example, approximately 4%), may be reflected towards the sample lens 42. This small reflectivity may generally arise with any substantially transparent material. The glass 38 is oriented so that the reflected light falls on the sample lens 42.

The sample lens 42 collects the light from the glass 38 and passes a portion of the light through a window 44 in each display. In other words, the light is caused to follow the light path 22 in FIG. 1 and is passed out of one display for collection by a circuit 23 in another display. The photodetector 24 provides information to a processor 30, associated with a display in the illustrated embodiment.

A beam splitter 41 may be used to split the light sample into three beams. One beam may be analyzed in the display producing the light sample. The other two beams may be conveyed over paths 22 to neighboring displays for analysis in those displays.

Thus, the display 18, for example, may receive information about its own light output and may receive information from both the displays 14 and 16, as indicated by the paths 22. This information may be analyzed by a correction coefficient storage unit 46, which may include a non-volatile memory, such as a flash memory, may retain this information. The unit 46 may develop and store a coefficient for correcting a particular display, based on the characteristics of the displays in the same display wall. Moreover, as the system works from display to display throughout the whole array, the correction coefficients may correspond to the characteristics of the weakest display in the overall display wall, in one embodiment of the present invention. The correction coefficient is then applied to the multiplier 32 to adjust the characteristics of the display 18, in the illustrated example, based on the information received from the display 18 and its neighboring displays.

In one embodiment of the present invention, the display 12 in the upper leftmost corner may be arbitrarily denominated the master display. It may provide information in the form of light samples to both the displays 14 and 16. The displays 14 and 16 may then adjust their outputs, based on the information from the display 12. If the displays 14 and 16 are unable to match the characteristic of the display 12, they may indicate to the display 12, over a path 20, that one of their characteristics will become, in effect, the model, which other displays will emulate.

The display 14, for example, then provides its adjusted output to the display 18 and to another adjacent display, not shown in FIG. 1. Similarly, the display 16 provides its adjusted output to display 18 and another display not shown in FIG. 1. In this way, the information is propagated throughout the display wall from display to display, coordinated by the controller 31 if desired, to produce a relatively uniform output across all the displays making up the display wall.

Figure 4:
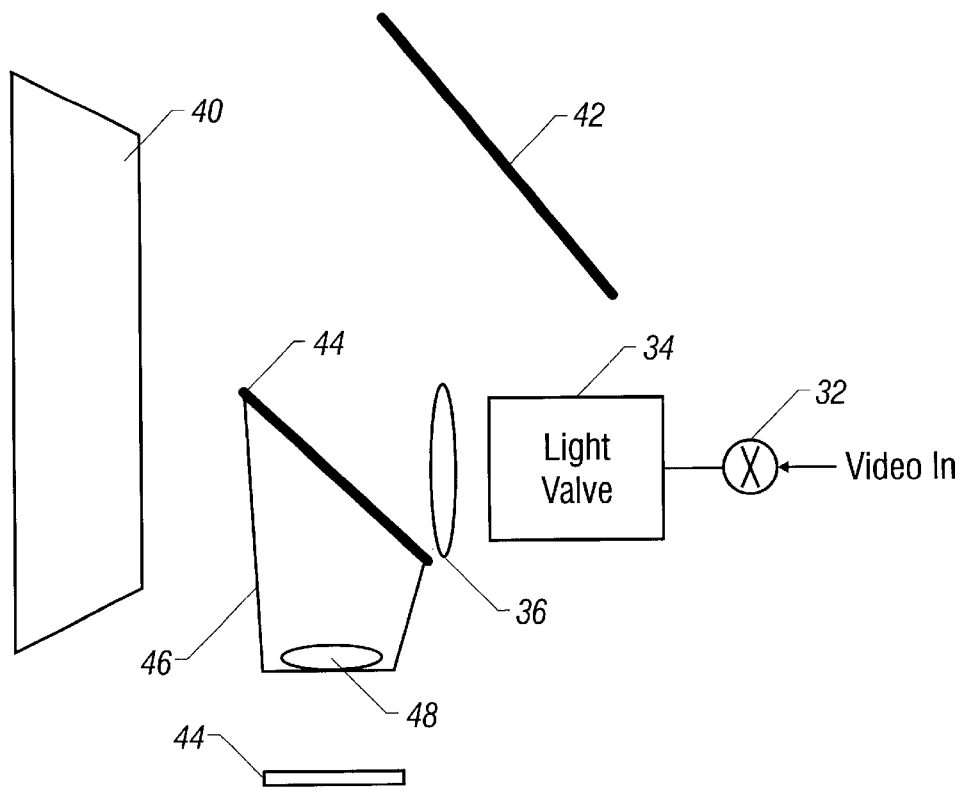
FIG. 4 is a schematic depiction of a projection display in accordance with another embodiment of the present invention.

Another technique for forming the light samples is shown in FIG. 4. In this case, the output from the projection lens 36 is applied to a projection mirror 44, which projects light to another projection mirror 42. The mirrors 42 and 44 may be folding mirrors. The mirrors 42, 44 may be formed to reflect substantially all of the light they receive. Even so, reflective mirrors still transmit some light. For example, a substantially reflective mirror may transmit from about 1–2% of the light that falls on its reflective surface. The light transmitted may be focused by a lens 48 contained in a light-proof enclosure 46. Some of this light may then be transmitted through a window 44 onto a path 20, as described previously.

While the techniques shown in FIGS. 3 and 4 are illustrative only, they share the common characteristic that a small amount of the overall light output may be extracted and used as a sample to create a measure of the light output of a particular display. This measure can be communicated to other displays, either electrically or in the form of a sample light beam.

While the embodiment illustrated in FIG. 2 shows different photodetectors 24, 24a and 24b being used for each of the samples, a single photodetector may be used for all the samples. For example, a single photodetector may be moved to receive each of the incoming light beams at the appropriate times. This avoids the need to calibrate the characteristics of each photodetector to match those of all the other photodetectors. By using three separate photodetectors that are calibrated to have the same responsivity to the light, variations in the optical performance of the various components sampling the light may be calibrated out.

Figure 5:
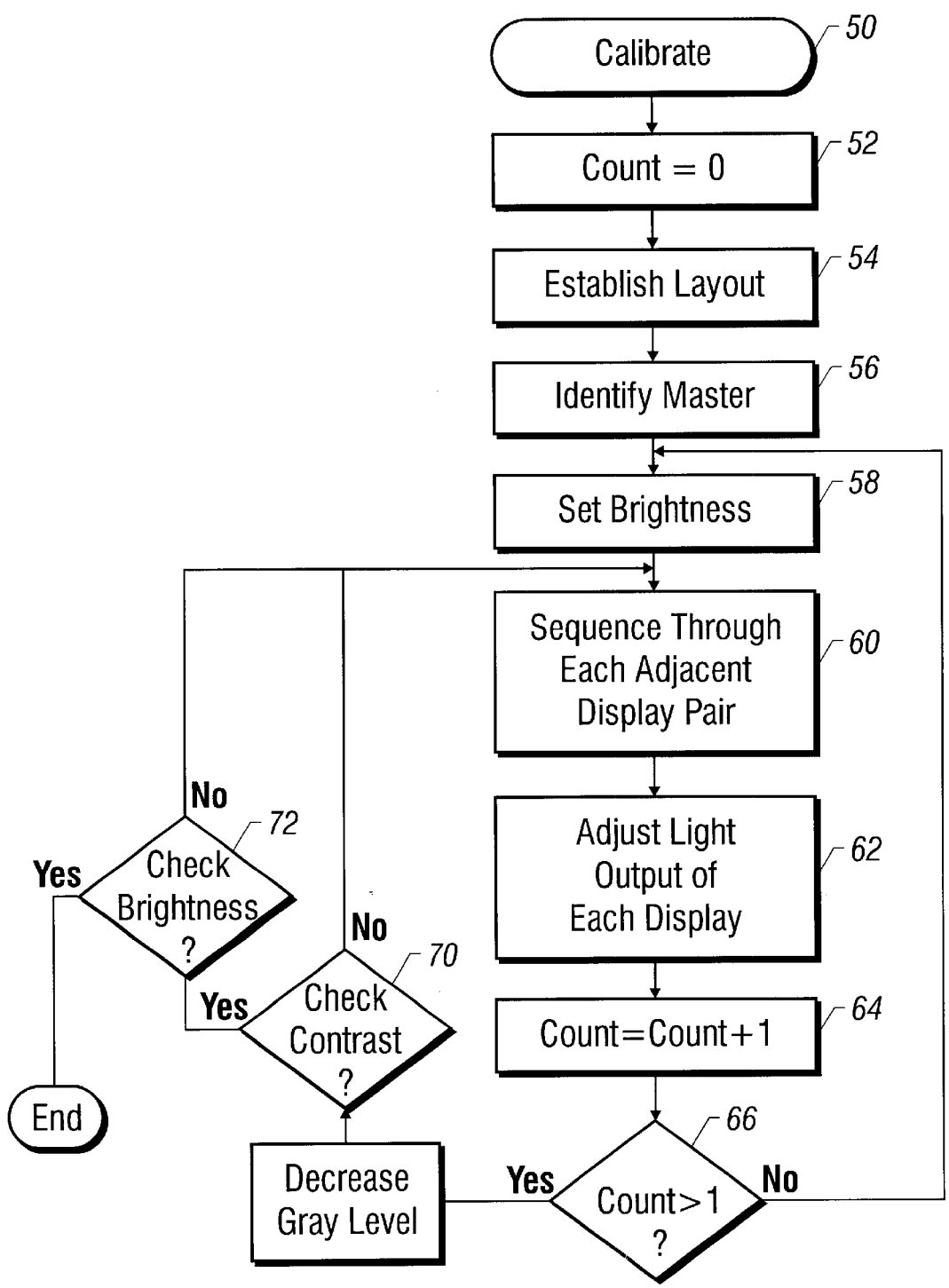
FIG. 5 is a flow chart for calibrating projection displays in accordance with one embodiment of the present invention.

Referring now to FIG. 5, a calibration technique, may be implemented in software 50, stored in the memory 33 of the controller 31, in one example, or in association with each processor 30, in another example. The software 50 initializes the variable "count," as indicated in block 52 and then establishes the layout of the displays forming the display wall 10, as indicated in block 54.

The layout may be established by sequencing through each display, one at a time, turning the screen of each display all white. The display may be turned on and off to identify the topology of the configuration of displays and allow each display to understand which displays are adjacent to it. For example, when the display 12 is turned on, the display 16 receives a light sample, and therefore the display 16 has information which may be stored in the storage unit 46 that it is adjacent to display 12. A display may receive information about what display was turned on at any given instant of time from the controller 31 in one example.

Next, a display, e.g., display 12, is identified as the master, as indicated in block 56. The identification of the master display may be in accordance with an algorithm stored in the storage medium 33. The upper leftmost display 12 may be arbitrarily selected as the master. The calibration sequence may then flow through the display wall 10 from the upper left to the lower right display, in one embodiment.

In one system described herein, the displays may effectuate the calibration technique themselves. For example, the displays may use the light paths to establish communication, and unambiguously resolve overall display configuration, thereby determining which display is the master for any particular subset of the calibration procedure. In an alternative embodiment, the controller 31 may totally control the calibration process, receiving all the information from each display and cycling the various displays through the calibration sequence.

Initially, the master display may be set to a brightness (block 58) of less than 100% (for example, 95%), in order to provide headroom. This may account for the possibility that the master display may, in fact, be the strongest display, or in one illustrated embodiment, the one that has the brightest output.

Next, as indicated in block 60, the flow sequences through each pair of adjacent displays (for example from left to right and top to bottom), comparing, in the processors 30, the light output of a target display with the reference created at least, initially, by the master display. The brightness of each display, after the master, may be set to 100%, even though the master is set to 95%, in one illustrated embodiment.

If possible, the light output of each display is adjusted to match the master, as indicated in block 62. Otherwise, the level of the master may be lowered and the calibration process may start over. This process continues from the upper left to the lower right until all the displays have matching characteristics.

Next, the variable "count" is incremented as indicated in block 64. A check at diamond 66 determines whether the variable "count" is greater than 1. If the variable "count" is not greater than 1, the flow cycles back to block 58. At block 58, the brightness may be set to a 50% gray scale. Each display may be adjusted for a combination of contrast and brightness to ensure that the gray scale adjustments are the same. This may enable a calibration of the gray scale for all the different displays. The process described above may then repeated to match the 50% gray scale between all the displays, in one embodiment.

When the 50% gray scale cycle is completed, the variable "count" is now greater than one, as determined at diamond 66. As a result, the gray scale is progressively decreased (block 68), in stepped fashion, until both the contrast and brightness are correlated between the units and correctly set for each unit. This establishes a common level for black and a common brightness level. At diamond 70, the contrast is checked, and if it is not correct, the flow returns to sequence through the displays. If the contrast is correct, the brightness is checked, as indicated in diamond 72, and the calibration sequence is terminated when the brightness is correct for each unit. Otherwise, the process is repeated to ensure that both the brightness and the contrast are correct.

One advantage of certain embodiments of the present invention is that the information about where each display is situated relative to all the other displays can be used to distribute the information to form the composite display wall image. For example, once it is known what display is in the upper left hand corner, the image for the upper left had corner can be sent to that display. This allows the displays to be oriented randomly with respect to one another. Thereafter, the correct display information is then sent to each display based on its known position. Once the operator has assembled the video wall by stacking the units together, plugged in the power and video, the individual displays can configure themselves automatically. In effect each display can ask for the appropriate video information given its current position.

As a result, in one embodiment of the present invention, the video signals for all of the displays making up a display wall may be provided to each of the displays, for example, in a serial fashion. Each display, based on its position, may then extract a portion of the overall video feed that is appropriate for the portion of the image which that display provides. Thus, if the overall video information was appropriately coded, each display may find and extract the desired portion of the composite signal. This embodiment avoids the need to separately wire from a central box to each of the displays. Moreover, it improves the modularity of the display wall.

While the present invention has been described with respect to a limited number of embodiments, those skilled in the art will appreciate numerous modifications and variations. It is intended that the appended claims cover all such modifications and variations as fall within the true spirit and scope of the present invention.

What is claimed is:

1. A method of calibrating a projection display comprising:

generating a light output containing image information;

extracting a sample from said light output;

using such sample to calibrate the display;

projecting said light output onto a screen;

generating a plurality of light outputs from a plurality of different displays;

comparing a sample from one display with a sample from another display; and causing a light sample extracted from said light output to pass out of one display and to be detected in another display.

2. The method of claim 1 wherein generating a light output includes using a light valve.

3. The method of claim 2, including using a reflective projection display to generate said light output.

4. The method of claim 1 wherein extracting a light sample includes causing the light output to shine on a substantially reflective surface and obtaining a sample from the light output transmitted through said reflective surface.

5. The method of claim 1 wherein extracting a light sample includes causing the light output to shine on a substantially transmissive surface and extracting a sample from light reflected from said transmissive surface.

6. The method of claim 1 including analyzing said sample to get a measure of the intensity of the light output.

7. The method of claim 1 including using the weaker of the two samples as a model.

8. The method of claim 1 including allowing said displays to automatically determine which displays are adjacent to one another.

9. The method of claim 8 wherein each of said displays compares at least one of its characteristics to a characteristic of at least one other display and adopts the characteristics of the other display, if possible.

10. The method of claim 1 including receiving, in a first display, information about a characteristic of a second display, comparing said characteristic of said first and second displays and causing one of said displays to adopt the characteristic of another display.

11. A display wall comprising:

a plurality of displays;

at least two of said displays including a sampler adapted to sample the light output of the display and to analyze said output;

a beam splitter adapted to split said sample and provide said sample from one display to the other display; and a comparator adapted to compare the sample from one display with a sample from the other display.

12. The wall of claim 11 wherein said sampler is a substantially transmissive device.

13. The wall of claim 11 wherein said sampler is a substantially reflective device.

14. A method of calibrating a plurality of displays comprising:

extracting a sample of the light output of one of said displays;

comparing said sample to a sample of the light output of another of said displays; and extracting a sample of the light output of a first display and passing said sample as a light beam from the first display to the second display through an opening in said first display.

15. The method of claim 14 wherein extracting a sample includes forming a light beam including image information, passing said light beam through a substantially light transmissive device, and collecting a portion of said light reflected by said substantially light transmissive device.

16. The method of claim 14 wherein extracting a sample includes forming a light beam including image information, reflecting said light beam off a substantially reflective surface and collecting the portion of said light beam which passes through said substantially reflective surface.

17. The method of claim 14 including automatically sharing a sample of the light output from one display with another display.

18. The method of claim 17 including first adopting the light output of another display if the other display has a different light output.

19. The method of claim 14 including automatically denominating one of said displays as a master, and using the characteristics of that display as a model which may be emulated by the other displays.

20. The method of claim 14 including providing a sample of the light output of one display to two neighboring displays.

21. The method of claim 20 including causing each display to record a correction factor to correct its light output to match that of other displays.

22. A method of calibrating a projection display comprising:

generating a light output containing image information;

extracting a sample from said light output;

using said sample to calibrate the display;

projecting said light output onto a screen;

generating a plurality of light outputs from a plurality of different displays; and allowing said displays to automatically determine which displays are adjacent to one another.

23. The method of claim 22 wherein each of said displays compares at least one of its characteristics to a characteristic of at least one other display and adopts the characteristics of the other display, if possible.

24. A method of calibrating a projection display comprising:

generating a light output containing image information;

extracting a sample from said light output;

using said sample to calibrate the display;

projecting said light output onto a screen;

generating a plurality of light outputs from a plurality of different displays; and receiving, in a first display, information about a characteristic of a second display, comparing said second characteristic of said first and second displays causing one of said displays to adopt a characteristic of another display.

* * * * *